United States Patent [19]

Hanemaayer

[11] Patent Number: 5,339,568
[45] Date of Patent: * Aug. 23, 1994

[54] AWNING WINDOW ASSEMBLY AND OPERATOR THEREFOR

[75] Inventor: Jacobus N. Hanemaayer, Kitchener, Canada

[73] Assignee: Hanmar Motor Corporation, Kitchener, Canada

[ * ] Notice: The portion of the term of this patent subsequent to Apr. 14, 2009 has been disclaimed.

[21] Appl. No.: 924,896

[22] Filed: Aug. 4, 1992

[51] Int. Cl.$^5$ ............................................. E04F 11/00
[52] U.S. Cl. ......................................... 49/324; 49/346
[58] Field of Search ................. 49/324, 346, 342, 261, 49/375, 350, 351

[56] References Cited

U.S. PATENT DOCUMENTS

| | | |
|---|---|---|
| 1,385,574 | 7/1921 | Nordstrom . |
| 1,456,468 | 5/1923 | Schonfield . |
| 1,956,476 | 4/1934 | Rund . |
| 2,528,572 | 11/1950 | Bancroft . |
| 2,621,377 | 12/1952 | Meyers . |
| 2,662,766 | 12/1953 | Burress . |
| 2,774,591 | 12/1956 | Jewett .................................. 49/324 |
| 2,811,349 | 10/1957 | Bondurant et al. . |
| 2,899,195 | 8/1959 | Ahlgren . |
| 3,098,647 | 7/1963 | Teggelaar et al. . |
| 3,139,276 | 6/1964 | Hay . |
| 3,258,874 | 7/1966 | Martin . |
| 3,457,675 | 7/1969 | Armstrong . |
| 3,461,609 | 8/1969 | Armstrong . |
| 4,068,408 | 1/1978 | Hauber .................................. 49/324 |
| 4,104,825 | 8/1978 | Hosmer . |
| 4,143,556 | 3/1979 | Hauber . |
| 4,353,185 | 10/1982 | Saigne .................................. 49/351 |
| 4,617,758 | 10/1986 | Vetter . |
| 5,103,590 | 4/1992 | Hanemaayer .................. 49/324 |

FOREIGN PATENT DOCUMENTS

| | | |
|---|---|---|
| 595250 | 3/1960 | Canada . |
| 629974 | 10/1961 | Canada . |
| 642155 | 6/1962 | Canada . |
| 687893 | 6/1964 | Canada . |
| 738877 | 7/1966 | Canada . |
| 843286 | 6/1970 | Canada . |
| 1263542 | 3/1968 | Fed. Rep. of Germany . |
| 85521 | 6/1920 | Switzerland . |
| 1120641 | 7/1968 | United Kingdom . |
| 1377529 | 12/1974 | United Kingdom . |

Primary Examiner—Philip C. Kannan
Attorney, Agent, or Firm—Killworth, Gottman, Hagan & Schaeff

[57] ABSTRACT

Awning window assemblies for use in recreational vehicles, mobile homes and the like include an improved operator having twin pivoting operator arms with flexible extensions carrying free rolling balls at the distal ends thereof which move in a track on the awning window to effect pivoting of the latter. The window assembly includes a clamp ring integral with the skin of the vehicle body within which a fixed window frame is secured. The window frame is provided with improved window pane securements readily removable storm windows and screens.

13 Claims, 7 Drawing Sheets

AWNING WINDOW ASSEMBLY AND OPERATOR THEREFOR

BACKGROUND OF THE INVENTION

This invention relates to window assemblies and in particular to window assemblies for use in awning-type windows, particularly those of metal construction such as might be used in recreational vehicles, mobile homes and the like.

As described in my related U.S. Pat. No. 5,103,590 issued Apr. 14, 1992, (disclosure of which is incorporated by reference) the prior art has provided numerous forms of closure operators for awning windows and the like. One such prior art arrangement has a twin arm operator located in a fixed position in the center of the fixed frame at the bottom of the awning. Since the operator is fixed, the arms are not able to move upwardly or downwardly to accommodate the arcuate path of travel of the awning window as it moves between the open and closed positions; such fixed arms can only move outwardly in a generally horizontal plane. In order to accommodate the arcuate movement of the awning window, the rigid twin arms have riveted to them flexible steel extensions with a small wheel on each end which runs in a track which is fastened to the bottom frame of the awning. A problem with these flex steel extensions on the twin arms is that the amount of flexing is relatively limited and this only allows the awning to open to a maximum of about 20° which has the effect of blocking the direct breeze from entering. Since the flexing movement of the steel extensions is limited, awning windows of substantial vertical dimension must be used in order to achieve a relatively shallow or flat arc of movement of the lower edge of the awning. Unfortunately, this arrangement does not permit the awning to be lifted up sufficiently to let direct breezes enter through the window. It would therefore be most desirable to provide a system enabling even relatively short awning windows to be lifted high, i.e. to open up to a very large angle to let the breezes in thereby to provide maximum ventilation. In summary, the twin arm operating arrangement previously known with the flex steel extensions can only be used with awning windows of a substantial height (vertical dimension) and yet at the same time the ventilating capability of such windows is very limited since the low degree of opening angle prevents direct breezes from entering.

My above-noted U.S. patent describes a window operator for a pivotally mounted window co-operable with a fixed window frame, the window operator comprising an operating mechanism mountable to said fixed window frame, and an elongated guide track adapted to extend along a marginal portion of the pivotally mounted window. The operating mechanism includes a rigid elongated arm means and means for effecting pivotal motion of said arm means, the arm means having motion transmitting means mounted to distal free end portions thereof, said motion transmitting means adapted to engage with said elongated guide track and to move therealong as the arm means are pivoted thereby to pivot the window between open and closed positions. The arm means comprises a pair of free-ended rigid arms adapted to pivot towards and away from one another in a first plane of movement to pivot the window between open and closed positions respectively, said motion transmitting means comprising a ball fixedly secured to the distal end of each of said arms, and said guide track being shaped to secure the balls therein while permitting free movement of the balls therealong. Each ball is secured directly to the distal end of each arm and the guide track includes an entrance slot sufficiently wide as to permit a predetermined Mount of angular motion of the arm relative thereto and hence of the window between the open and the closed positions.

SUMMARY OF THE INVENTION

While the window operator described in my U.S. patent has been found to work quite well, a need for additional improvements in terms of ease of operation, cost of manufacture, adaptability to differently sized windows etc. has led to an improved window operator system as set out below which combines many of the advantages of the systems noted above.

Accordingly, in one aspect there is provided a window operator for a window assembly including a pivotally mounted window having a movable window frame co-operable with a fixed window frame. The window operator includes an operating mechanism adapted to be mounted to said fixed window frame and an elongated guide track extends along a portion of the movable window frame. The operating mechanism includes elongated arm means and means for effecting pivotal motion of said arm means. The arm means has motion transmitting means mounted to distal free end portions of same, said motion transmitting means adapted to be engaged with said elongated guide track and adapted to move therealong as the arm means are pivoted thereby to pivot the movable window frame between open and closed positions. The motion transmitting means comprises a ball rotatably mounted to the distal end of the arm means. The ball is adapted to be received and retained in said guide track and moves both longitudinally of the track and rotates relative to both the track and said arm means when in use as the arm means is pivoted by the operating mechanism to move the movable window frame between the open and closed positions.

As a further feature said arm means includes an inner rigid arm portion adjacent the operating mechanism and an outer flexible arm portion attached to and projecting outwardly of a distal end portion of the rigid arm portion. The ball is rotatably mounted to the distal end of said flexible arm portion.

Still further according to the invention said flexible arm portion comprises a flat strip capable of flexing as the movable window frame opens and closes.

In a preferred form of the invention said ball comprises two semi-spherical portions connected by a stem, said strip having an aperture receiving said stem at its distal end and said ball portions being disposed on opposing sides of said strip in slightly spaced relation thereto to ensure free rotation of the ball relative to the strip as the ball is moved by the arm means along the groove of the guide track.

Preferably said stem is in a force fit relation within a hole in one of said ball portions, the stem length being greater than the hole depth to provide the clearance necessary to allow free rotation of the ball relative to the flexible strip.

In the preferred embodiment the stem has external grooves extending axially thereof which can deform when the stem is forced into the hole in said one ball portion and/or to allow trapped air to escape from the hole and/or to help compensate for thermal expansion and contraction.

Typically said ball is of a synthetic plastics material and said strip is of a metal (e.g. steel or alloy steel) having spring-like characteristics.

The rotating ball system performs four functions all simultaneously, unlike the three functions described in my U.S. patent noted above. The four functions are (1) pivoting in a vertical plane (2) pivoting in a horizontal plane (3) rolling or turning (4) translational motion along a track. This is also distinctly different from the two function (rolling and travelling) action of a disc-like wheel in a track as shown in U.S. Pat. No. 4,104,825 for example.

The invention in another aspect also provides an improved window mounting arrangement. In particular there is provided, in a vehicle body having an exterior skin, an improvement comprising a clamp ring integrally formed with said skin and surrounding a window opening, and a fixed window frame located within said clamp ring, and means for securing said window frame within said clamp ring.

Further according to this aspect of the invention said clamp ring has an outwardly extending flange which is a continuation of the skin. The fixed window frame has an exterior window frame flange which overlies and engages the flange of the clamp ring. The means for securing acts to urge the window frame flange toward the flange of the clamp ring.

In a preferred embodiment said clamp ring has a web portion generally transverse to said clamp ring flange and an inturned terminal lip portion remote from said clamp ring flange and generally transverse to said web portion. The lip portion has spaced apart openings therein and said means for securing comprising a screw extending through each opening and into said window frame and engaging the latter. Hence as the screws are tightened, said window frame is drawn inwardly relative to said clamp ring to hold the window frame flange in engagement with the flange of the clamp ring whereby the window frame is fixedly secured relative to the clamp ring.

According to another aspect of the invention there is provided a window assembly having a window frame and means in the window frame defining a seat for a window pane. A window pane is disposed in said seat, and a resilient retaining means associated with said seat and bearing against marginal edges of the window pane to maintain the window pane in said seat, said resilient retaining means accommodating a range of window pane thickness.

In one embodiment said frame has a pair of spaced inturned rigid lips adjacent said seat and said resilient means comprises a generally V-shaped in cross-section body having a shallow groove in its apex to receive one of said rigid lips, and a pair of divergent legs, with one said leg of the V-shaped body overlying the other said rigid lip and the other said leg overlying marginal edge portions of the window pane and urging said pane into the seat.

In a further embodiment said frame has a recess adjacent said seat and a rigid lip portion at the mouth of said recess. The resilient means comprises a generally C-shaped-in-section seal defining spaced marginal longitudinal edges disposed in said recess. Said lip portion bears against a rear portion of the seal such that said spaced marginal edges of said seal bear against the window pane edges to maintain same in the seat.

As a further preferred feature said window frame has means to hold a storm window pane in spaced parallel relation inwardly of the first mentioned window pane. Said means to hold includes a groove in said frame to receive a lower edge portion of the storm window pane, a flange against which upper portions of the storm window pane bear and means to hold the window pane adjacent said flange. Said flange provides sufficient room at the top of the pane as to allow the window pane to be lifted upwardly sufficient as to clear the groove at the lower edge of the pane thereby to permit the latter to be swung outwardly and then lowered downwardly and removed from the window frame.

The window assembly may also be provided with a bug screen, said screen having a marginal frame engaged with the window frame. Said marginal frame has an undercut groove therein. Spaced headed pins are releasably retained in said frame, the heads of said pins being secured in said undercut groove to secure the bug screen marginal frame to the window frame.

BRIEF DESCRIPTION OF THE DRAWINGS

In drawings which illustrate one form of the invention.

DETAILED DESCRIPTION OF PREFERRED EMBODIMENT

Figure 1:
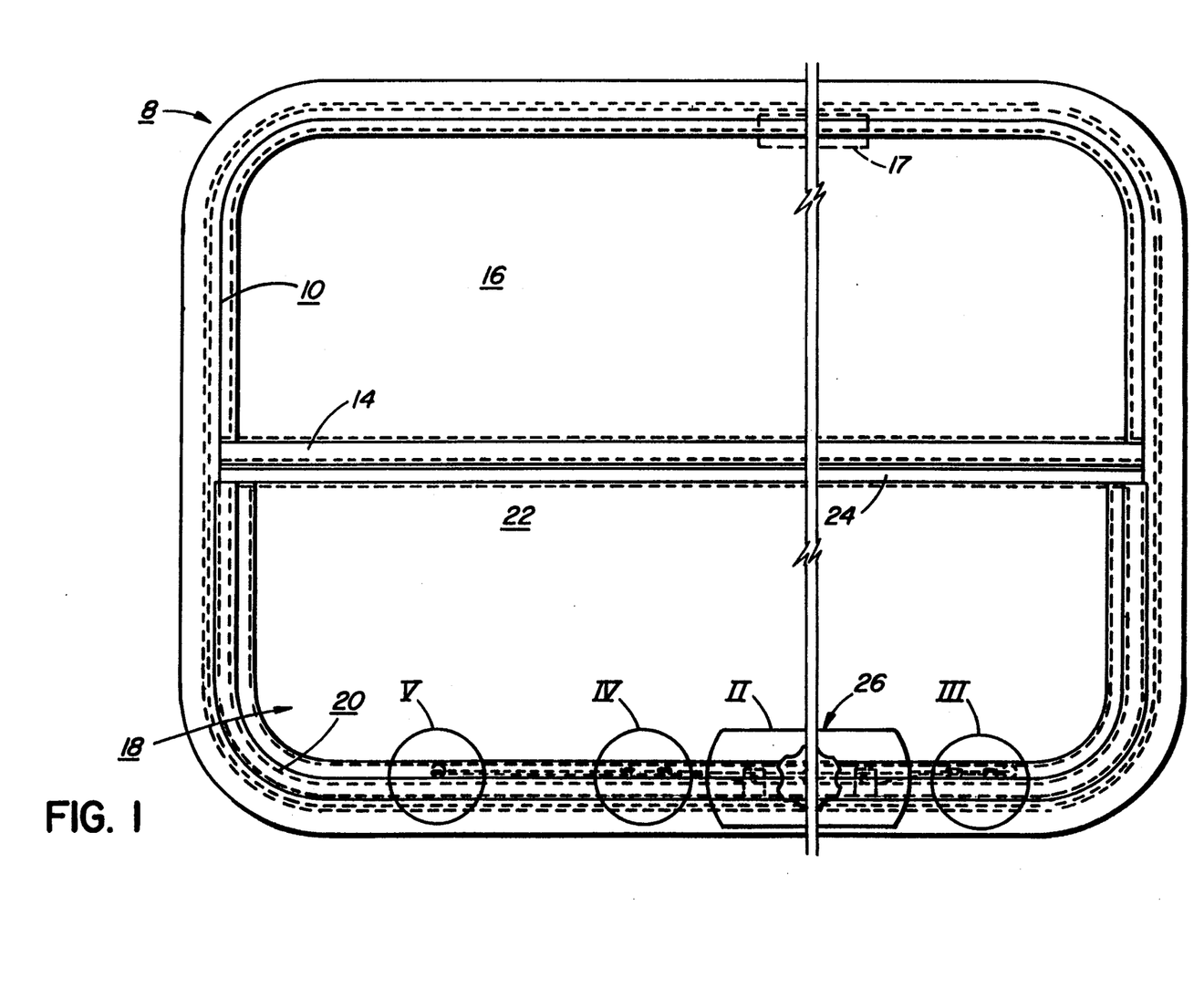
FIG. 1 is an elevation view of a window assembly.
Figure 2:
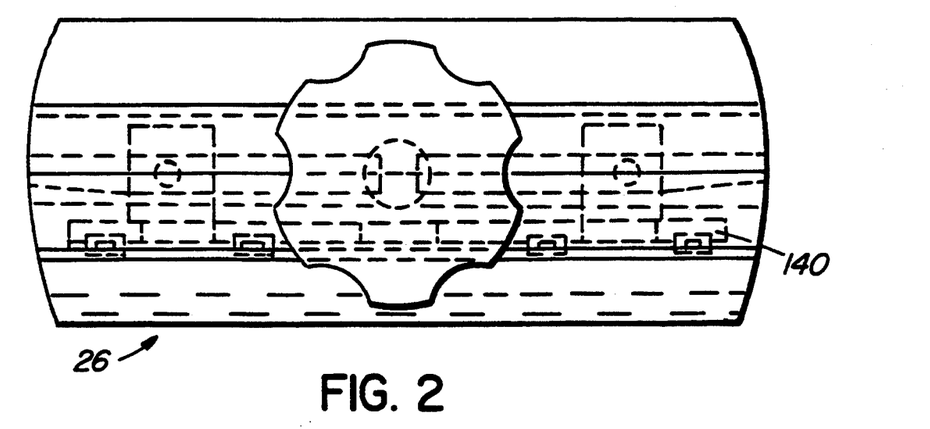
FIG. 2 is an enlarged elevation view of an operator assembly.

Referring to FIG. 1 of the drawings there is shown a window assembly 8 which includes a fixed window frame 10 made from a metal extrusion such as aluminum. The fixed window frame 10 is of a generally rectangular outline shape having rounded corners. The fixed frame 10 includes a horizontal fixed frame member 14 which extends completely across the fixed frame 10 and above which, in the upper half of frame 10 there is mounted a fixed window pane assembly 16 to be described hereafter. A splice bracket 17 for the fixed frame secures the abutting ends of the frame together. It is shown off-center in FIG. 1 (which shows large and small windows, i.e. the right side shows half a narrower window and the left shows half of a wider one).

The lower half of the window assembly includes an awning (movable) window assembly 18 having a lower awning window frame 20 which extends along the vertical sides and bottom edge of the awning window pane assembly 22, the corners of frame 20 being curved to match the contour of the fixed frame 10. Also included is a horizontal awning top frame member 24 which extends between the upper ends of awning frame 20 and is fixed thereto.

The awning window assembly 18 is pivotally movable outwardly and back to the closed position via an operator assembly 26 to be described in further detail later on. The window assembly 18 is pivoted by way of a hinge extending along and interconnecting the fixed horizontal frame member 14 and awning horizontal top frame member 24 together also in a manner to be described later on.

Figure 7:
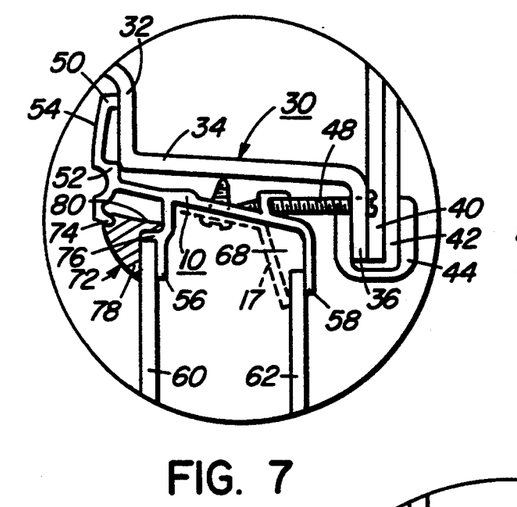
FIGS. 7, 8 and 9 are enlarged views of the cross-section of FIG. 6 taken at the top, middle and bottom portions thereof.
Figure 9:
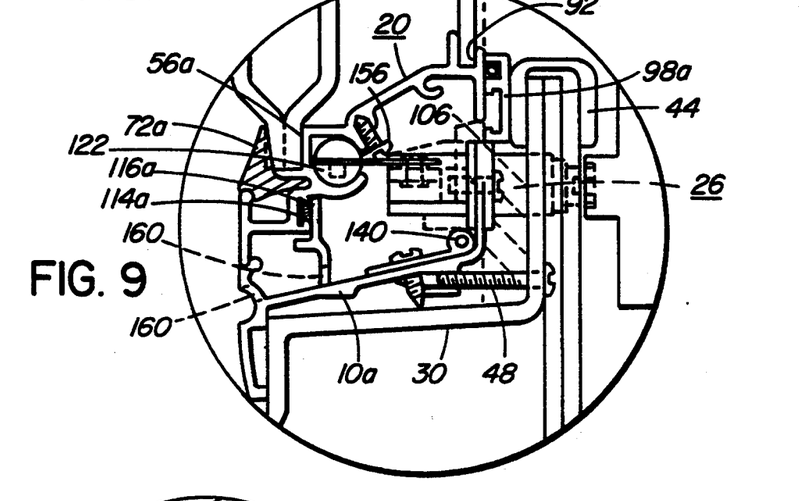

The entire window assembly 8 is mounted in a rectangular opening in a vehicle body as shown in FIGS. 7 and 9. The vehicle body is provided with a clamp ring 30 which extends all around the rectangular opening and is integrally formed with the exterior skin of the vehicle body. The clamp ring 30 includes an outward flange portion 32 which is a continuation of the exterior skin of the body, an inwardly extending web portion 34 transverse to flange 32 and an inturned terminal lip portion 36 generally transverse to web portion 34. The vehicle inside panelling 40 and interior decorating fabric 42 overlie the lip 36 and a flexible U-moulding 44 extends around and embraces the edges of the lip 36, panelling 40 and fabric 42 to provide a finished appearance all around the window opening as it appears from the inside of the vehicle.

In order to secure the window assembly 18 in place within the clamp ring 30, the inturned lip portion 36 has a multiplicity of openings spaced apart around the window opening and through each of which extends a retaining screw 48 (FIGS. 7 and 9), the inner end being threaded into the fixed window frame 10, hence urging the frame 10 inwardly of the clamp ring 30 with shoulders 50 and 52 of fixed frame exterior flange 54 being in engagement with the clamp ring flange 32 thus holding the window frame 10 in a fixed location in the vehicle side wall. Suitable gaskets (not shown) between flange 54 and the clamp ring flange 32 prevent leakage of water etc. therebetween. The clamp ring 30 holding the window assembly 8 in place is (as noted previously) built-in and integrated with the exterior skin of the body of the vehicle (or any other container of space). This is a significant feature as up to now window manufactures have supplied separate clamp rings, (i.e. ones that are placed against the inside of the exterior skin at the edge of and around the window opening, which opening is even with the exterior skin.) The result is that the edge of the window opening is sandwiched between the separate clamp ring and the flange 54 of the window frame 10. One can easily see that the built-in clamp ring 30 is more practical and economical to produce and does not require installation during assembly of a vehicle. There is virtually no extra cost as the clamp ring 30 is formed at the same time with the exterior skin. It is also very accurate, reduces human error during assembly and saves time.

The means for holding the fixed window assembly 16 in place in the upper half of fixed frame 10 will be described with reference to FIGS. 6, 7, 8 and 13. The fixed frame 10 is provided with a spaced parallel pair of inturned flanges 56, 58 which serve to seat outer and inner window panes 60, 62 respectively, while fixed horizontal frame member 14 also is provided with recess 64 and groove 66 within which the lower edges of panes 60, 62 are disposed. The inner pane 62 (a storm window) is secured in position against frame flange 58 by means of the centrally located splice bracket 17 (shown in dashed lines), which bracket bears against the upper central edge portion of the pane. The space 68 above the pane 62 permits it to be lifted up clear of groove 66 and removed. A shallow lifting groove 70 cut into the pane 62 facilitates the lifting of same.

The outer pane 60 may be a single pane or a formed double pane arrangement, both of which variants are shown in the drawings. The top and side edges are secured by a flexible rubber seal 72 retained between spaced apart inturned lips 74, 76 of the fixed frame 10. The rubber seal 72 is of a generally V-shape configuration in cross-section and has a shallow groove in its apex to receive the lip 74 and leg portions 78, 80 approximately at right angles to one another, one leg 80 overlying inturned lip 76 and the other 78 overlying the outside edge portion of the outer pane 60. The lower edge of the outer pane 60 is secured by a further rubber seal 82 in the recess 64. Recess 64 is provided with an inturned lip 84 which seats in and bears against a rear portion of seal 82 and retains the spaced longitudinal marginal edges of the somewhat C-shaped in section seal 82 in tight pressurized relation with the exterior pane.

The flexible rubber seals 72, 82 will bend to different shapes to retain several different thickness of single and double layered outer panes of glass 60 chosen at will. One of these thicknesses is shown in FIG. 7. A spaced apart twin pane insulating glass retained by the same rubber seals 72, 82 can be seen in FIG. 8. When two "double diamond" (a term used to describe a certain thickness of glass) thickness glass panes are used to form a twin pane insulating glass unit the corner at the edge surrounding the pane then requires to be made a little thinner by grinding or is reduced during the manufacturing process. When two single diamond thickness glass panes are used to form a twin pane insulating glass (or panes of a thickness between double and single diamond) then the corners at the edges don't require reducing as can be seen in FIG. 8.

As noted above, the awning window assembly 18 includes an awning window lower frame 20 and a horizontal top frame member 24 which together surround and retain the awning window pane assembly 22 per se. The awning window pane assembly 22 includes an inside storm window pane 62a having a lifting groove 70a similar to that described previously. Referring to FIG. 8 the frame member 24 defines a deep groove 90 which receives the upper edge of inside pane 62a. Groove 90 provides adequate space as to allow the pane 62a to be lifted upwardly (via lifting groove 70a) until its lower edge clears a groove 92 in the lower awning frame 20 thereby to permit removal of the inner pane 62a.

Figure 6:
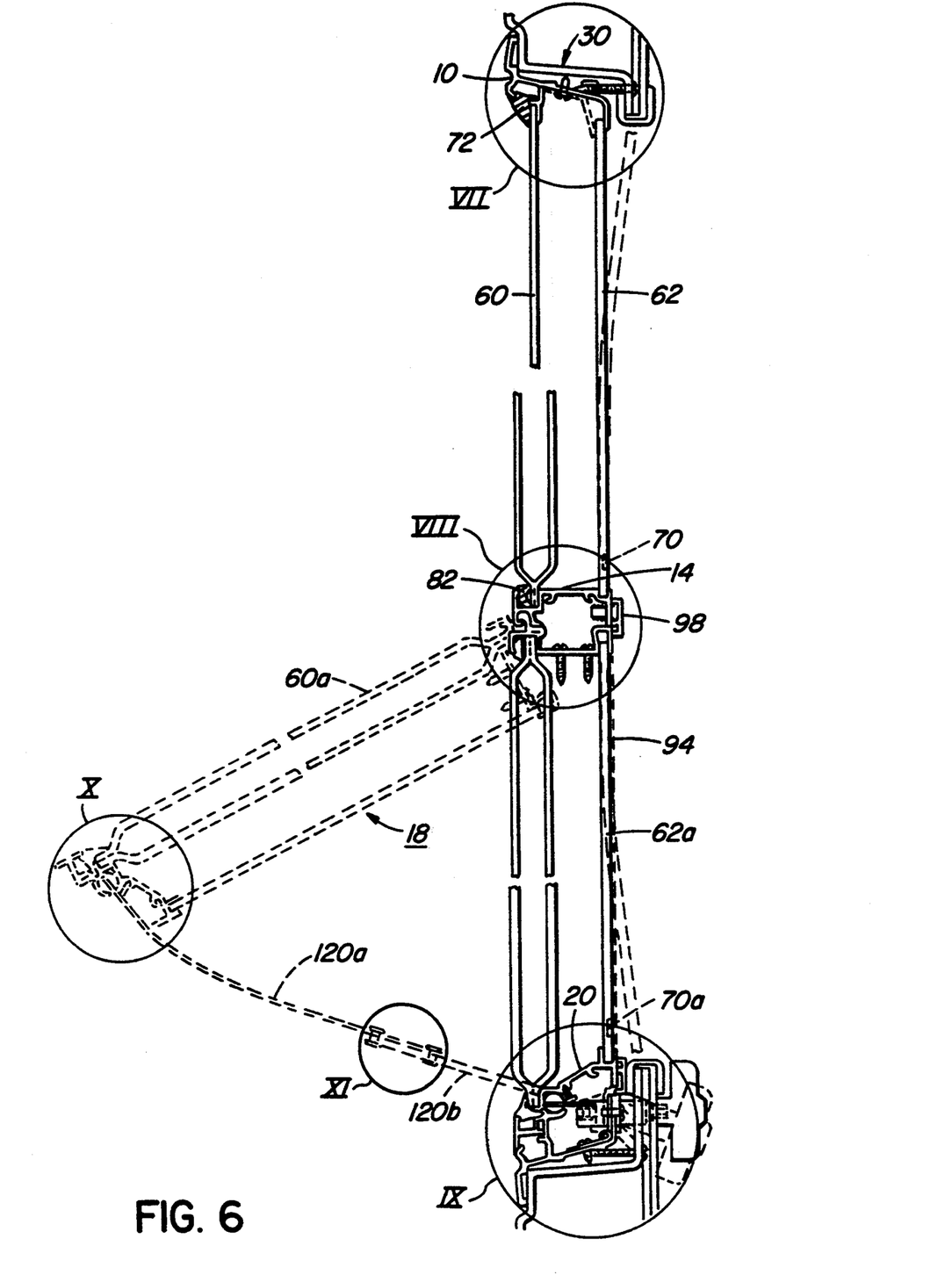
FIG. 6 is a vertical cross-section of the window assembly mounted in a vehicle body showing closed and open window positions.
Figure 8:
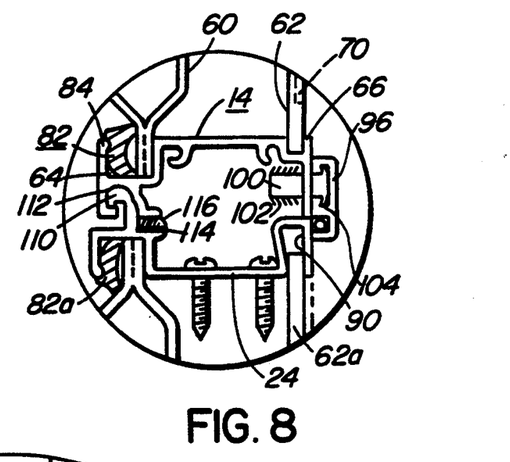
Figure 10:
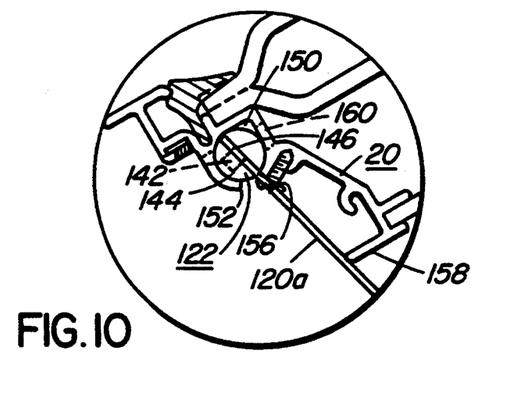
FIG. 10 is an enlarged cross-section view of the lower edge portion of the movable window in open position.

The exterior pane 60a of the awning window 22 can be a single pane or, as shown in FIG. 6 etc., a formed double pane insulating glass. Rubber seals 72a and 82a are very similar to seals 72 and 82 described above (permitting retention of different glass thicknesses etc.)

and are retained in the lower and upper awning window frame members 20, 24 as clearly shown in FIGS. 8, 9 and 10 by means very similar to those described previously with reference to the fixed window frame assembly.

There are drain holes 160 in frame member 20 of the moveable awning window 18 and member 14 of the fixed window assembly to dispose of condensation.

Figure 13:
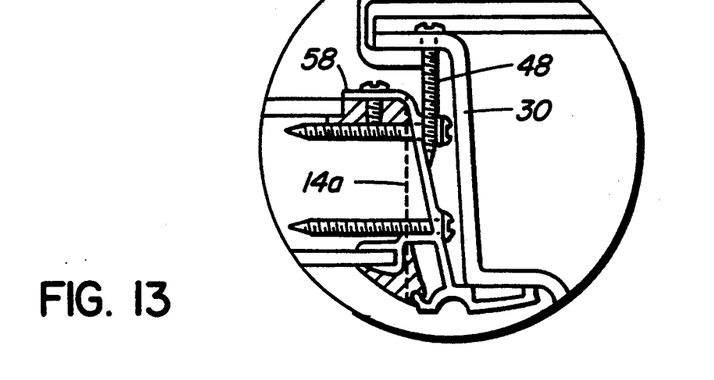
FIG. 13 is a cross-section view of a vertically extending section of the fixed window frame and clamp ring.

FIG. 13 is a horizontal cross section through the right vertical section of fixed frame 10 of the window assembly at and above the fixed horizontal frame member 14. The frame member 14 ends at the broken line 14a. A suitable stop, shown by cross hatching, overlaps the joint between the inner flange 58 of the vertical frame section and the inner (storm) window pane 62 of the upper fixed portion of the window assembly.

Figure 15:
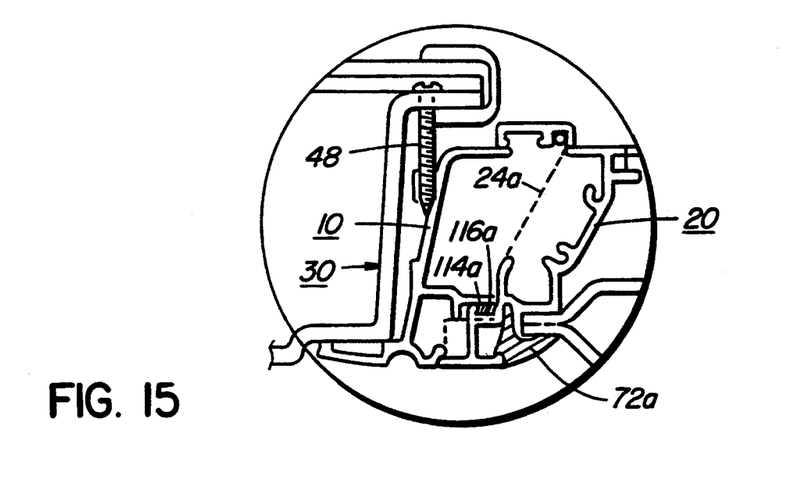
FIG. 15 is a view similar to FIG. 13 but taken lower down through the movable window and adjacent fixed frame sections.

FIG. 15 is a horizontal plan view cross section through the left vertical section of fixed frame 10 of the window assembly 8 and the left vertical portion of frame 20 of the moveable awning window 18 at a location below the horizontal top frame member 24 of the moveable awning window 18. The horizontal top frame member 24 ends at the broken line 24a.

During installation the outer glass panes 60, 60a are inserted into the grooves (recesses) in the fixed and movable horizontal frame members 14 and 24 respectively and then laid against the flanges 56, 56a of fixed frame member 10 and awning window frame 20 respectively following which the rubber seals 72, 72a are inserted to secure the panes 60, 60a in place. This method makes for much easier and more economical assembly and pane replacement than other methods. A commonly used method requires the panes to be inserted on all four sides in grooves in the frames surrounding the panes, during assembly and the frames must be taken apart for replacement of glass. The above-described new window frame is assembled before the glass is installed and seal inserted. Both can be easily removed and replaced for repair of broken panes without taking the frames apart.

The window assembly also includes a bug screen 94 located inside of and overlying the awning window assembly 18 when the latter is closed. Screen 94 is of course fixed to the fixed window frame 10 including the fixed horizontal frame member 14. The bug screen includes an perimeter frame 96 shaped to match the frame members which it engages. The horizontal top member 98 of the bug screen 94 is held in place by plastic pins 100 (available commercially under the tradename X-mas tree stud) with flexible ribs or fins 102 (inserted through slightly smaller holes than the flexible fins or ribs 102), in the inside flange of fixed horizontal frame member 14. Flanges on one end of the pins 100 are slidably trapped by flanges in a suitable undercut groove 104 in the top member 98 of the bug screen 94. This makes for easy placement and removal of the bug screen 94. The lower member 98a of the bug screen 94 is held in place between the U-mould 44 and a stop 106 (shown in dashed lines in FIG. 9) running the full width of the window assembly except for a notch to accommodate the operator assembly 26.

As seen in FIGS. 6 and 8 the awning window assembly 18 can pivot outwardly relative to the fixed window frame 10 by a substantial angle, e.g. 60 degrees. A hook-like hinge element 110 formed on the awning horizontal top frame member 24 and extending the full length thereof pivots in a complementary full-length groove 112 formed in the fixed horizontal frame member 14.

When the operating mechanism (described hereafter) is disconnected, the window assembly 18 can be pivoted further outwardly and the hinge element 110 unhooked from groove 112 thus allowing for easy removal and replacement.

In order to provide a seal between the fixed and movable window assemblies, the top frame member 24 is provided with an undercut groove 114 which receives the base of a hair seal 116. Similarly the movable lower frame member 20 is provided with a groove 114a receiving the hair seal 116a. These seals contact suitable flanges as shown on the fixed frame 10 including the fixed horizontal member 14 to provide an effective weather seal between them.

The operating mechanism for pivoting the awning window assembly outwardly and back to the closed position will now be described. The operating mechanism includes a pair of operating arms 120 which are made to pivot outwardly and back by the operator assembly 26. The outer ends of the arms 120 each carry a rotating ball 122 which engages in a complementary groove 150 formed along the lower edge of the awning lower window frame 20, all of which will be described in further detail later on.

The operator assembly 26 (FIG. 14) is provided with a casing 130. An operating knob 132 rotates a worm gear (not shown) which engages teeth 134 on the inner ends of the operating arms 120, the latter being pivotally attached at 136, 138 to the casing 130. Casing 130 is mounted via hinge 140 to the lower horizontal section 10a of fixed frame 10 (FIG. 9).

Figure 3:
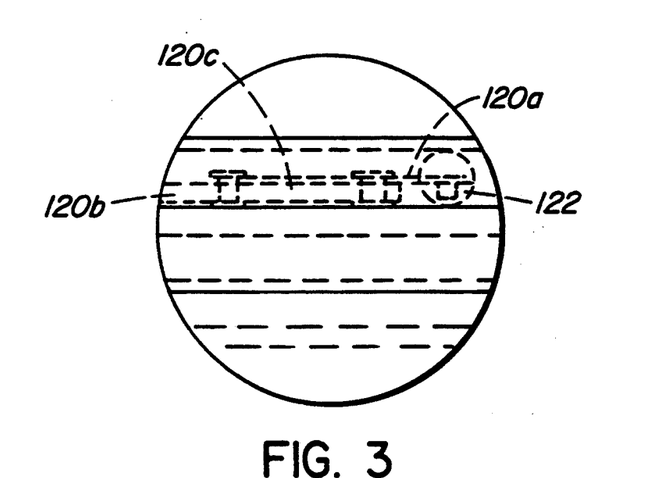
FIGS. 3, 4 and 5 are enlarged views of lower portions of the movable window frame showing portions of window operating arms.

FIG. 3 shows in phantom one form of operator arm 120 wherein a short flexsteel extension 120a is secured to the outer end of a rigid arm 120b of standard length, which is readily available commercially. FIG. 3 also shows a split or two-part ball 122 in close proximity to the riveted connection 120C between the flexsteel extension 120a and the standard length rigid operator arm 120b. The close proximity accommodates the shortest possible installation of a standard length operator arm 120b along with the shortest flexsteel extension 120a possible for a narrow window.

The split ball 122 (FIGS. 9 & 10) has a stem 142 protruding from the flat side of the center of the upper half of the ball 122 and a slightly smaller (for tight interference fit) hole 144 on the flat side in the center of the lower half of the ball 122. The two halves of the ball 122 are mounted on the end of the flexsteel extension 120a by first inserting the stem 142 through a slightly larger hole 146 (to allow for free ball rotation) near the outer end of the flexsteel extension 120a. The stem 142 is sufficiently longer than the hole 144 in the lower half of the ball 122 is deep to allow sufficient clearance between the two halves of the ball 122 and the flexsteel extension 120a as to provide free non-friction turning of the balls 122 when riding in a slightly larger but correspondingly shaped groove 150 defined by an integrated track 151 defined along the bottom of the moveable window frame 20 when opening and closing. The ball stem 142 has a number of very small lengthwise grooves 143 (FIG. 10A) equally spaced around its perimeter to allow for a better grip and to allow air to escape during assembly of the two halves of the ball 122 and to retain a tight fit during the contraction and expansion action of the balls 122 due to hot and cold temperatures. The balls 122 are made of a tough, self-lubricating plastic material (e.g. "Teflon" or other suitable material) for troublefree performance, smooth operation, economical manufacturing and ease of assembly.

When the shortest version of the flexsteel extension 120a is used (FIGS. 3 and 12) no actual flexing of the latter is required as the moveable awning window 18 does not open sufficiently for the operator arm 120 to come in contact with the bottom portion of the moveable window's lower frame member 20.

Figure 4:
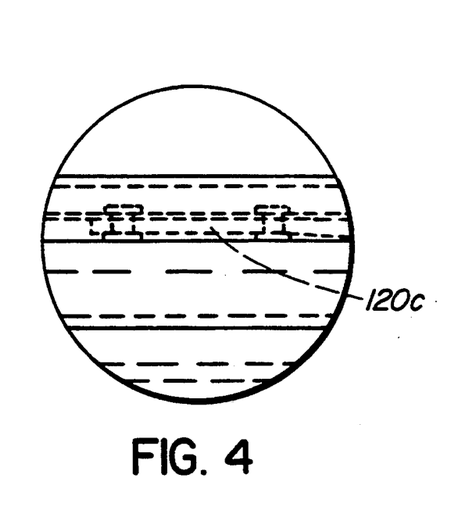
Figure 5:
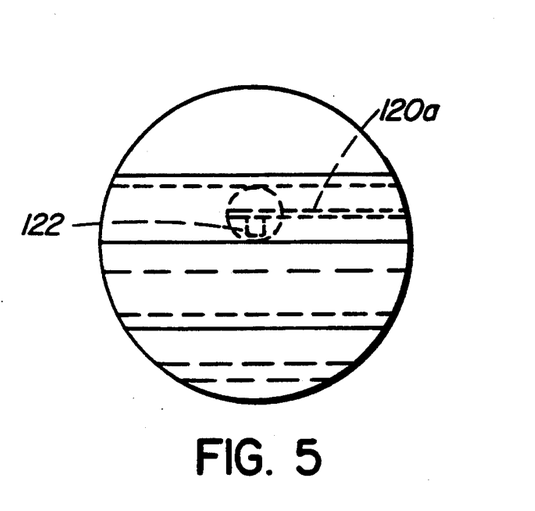

FIGS. 4, 5 and 6 show structures much the same as described in FIG. 3 above with the exception that the distance from the splice 120c (between the flexsteel extension 120a and the standard length operator arm 120b) to the split ball 122 is much greater and therefore it allows for flexing of the flexsteel extension 120a when the moveable awning window 18 is opened to its most extreme position possible (FIG. 6).

Figures 10A, 12:
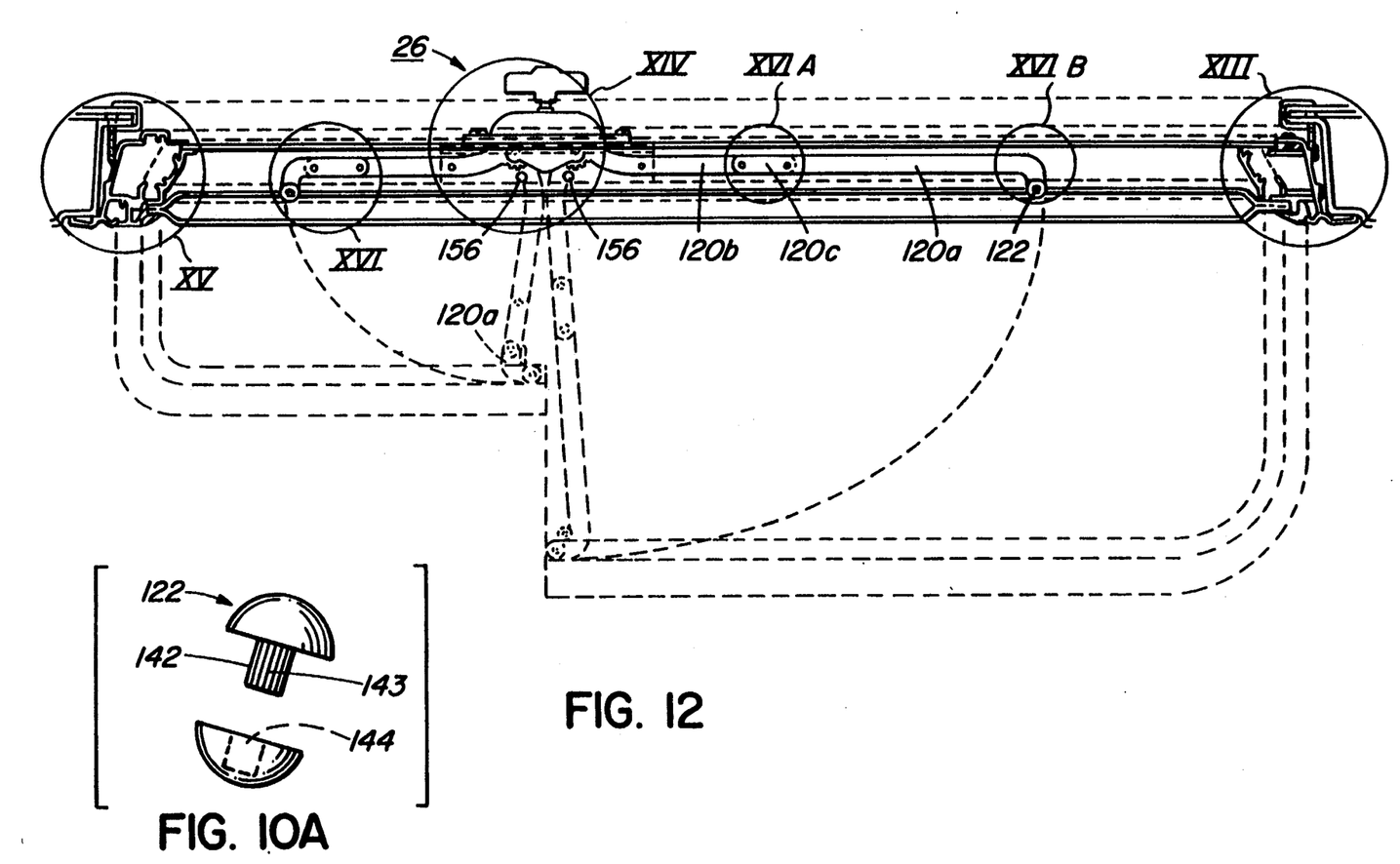
FIG. 10A shows the two halves of the split ball separated from one another.
FIG. 12 is a horizontal sectional view of the window assembly seen from above showing open and closed positions.
Figure 11:
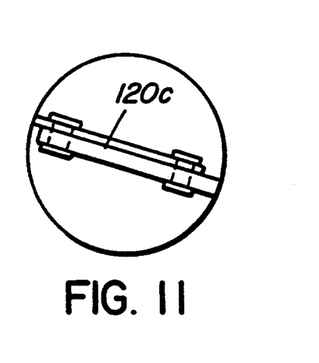
FIG. 11 is an enlarged view of the splice between the rigid and flexible portions of the operating arms.
Figure 16:
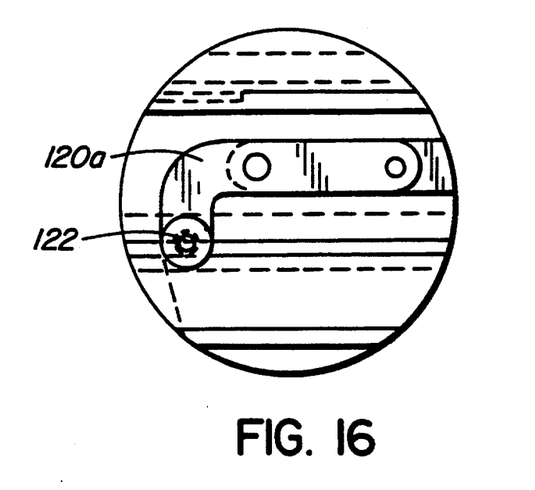
FIGS. 16 and 16B are enlarged views of the distal end portions of the operator arms and adjacent structures.
Figure 16A:
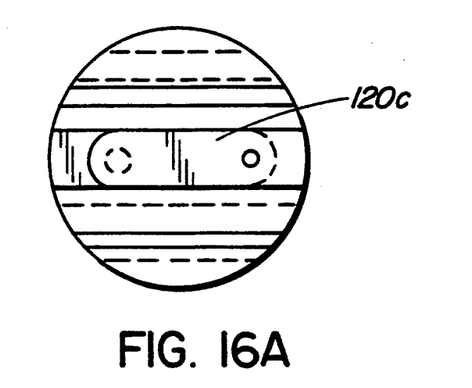
FIG. 16A is a view similar to FIG. 11.
Figure 16B:
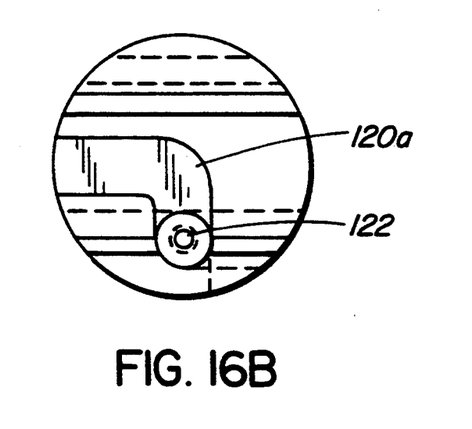

The flexsteel extension 120a in itself comprises a relatively thin flat strip of steel (typically about 10 mm wide by 1 mm thick) having sufficient temper as to withstand a substantial degree of flexure without permanent deformation, e.g. having spring-like characteristics. As best seen in FIGS. 12 and 16 the outer end of the extension adjacent the ball 122 is at right angles to the rest of the thin extension and thicker operator arm 120 to avoid interference between the track 151 and the extension and operator arm during operation.

The advantages of the flexsteel extension 120a, other than its flexing capability, are the ease of securing the ball 122 to the flexible extension, the ball's turning, riding and rolling action in the groove 150 of the track, and the extension's economical manufacture to almost any reasonable length to suit all windows, so that only one operator 26 with standard length operator arms 120b needs to be manufactured and stocked.

Only the longer flexsteel extensions 120a actually flex during operation. The shorter extensions 120a (as in FIG. 3) undergo only little or no flexing at all when under a certain length. Furthermore the flexsteel extensions 120a permit the use of a narrower entrance slot 152 in the track as compared with a rigid operator arm, thereby better securing the balls 122 in the groove 150. (Operators with different length of rigid arms with fixed non-rolling balls on the ends of the arms would be more costly to manufacture and stock than the flexsteel extensions 120a described above of various length.) Any required lengths of flexsteel extensions 120a can be manufactured at any time at will without substantial extra cost. Such would not be the case with the rigid prior art operator. In order to store the assembled operator arms, in the case of narrow windows, the short combination of arms can then only be used. The longer combination of arms can be used with correspondingly wider windows.

FIG. 9 shows a cross section of the lower part of the awning (movable) window assembly 18. Due to the substantial depth of the frame member 20 it conceals the operator mechanism 26 and arms 120 from view and makes this frame member much stronger than our previous design (see U.S. Pat. No. 5,103,590) which was much narrower and had its integrated track notched right through in the center and which depended on the glass pane for extra rigidity. This wider and stronger frame member 20 is a real asset when flexible plexiglass is used for glazing.

It is also noted here that the track 151 is only notched in the bottom flange to allow the balls 122 to enter and exit when set screws 156 are removed. As noted above, the slot 152 is narrower than the ball diameter to keep them in the groove 150 during opening and closing of the moveable awning window 18. Slot 152 is much narrower than the slot of the previous patented design (see my U.S. Pat. No. 5,103,590) as now only the extreme outer end portions of the thin flexible extensions 120a have to enter and run in the slot 152, instead of the thicker rigid operator arms.

The above-noted stop 106, lip 36 of clamp ring 30 and the fabric covered panelling 40, 42 all require notching for the entering and vertical movement of the operator housing 130 when opening and closing. This design keeps the lower member 98a of the bug screen 94 straight and therefore it does not have to be jogged up and over the operator housing as was the case in our previous design. This represents an improvement and makes for more economical manufacturing, stronger bug screen member 98a, better appearance and operation and helps keep the operator knob 132 below the bottom of blind and/or curtain level.

FIG. 10 shows the lower horizontal portion of frame 20 of the moveable awning window 18 in the most extreme open position. The set screws 156 are somewhat off center, lodged between the two flexsteel extensions 120a of the operator arms when the moveable window 18 is in the open position, thereby preventing the balls 122 from leaving the groove 150 in track 151. When set screws 156 are removed, allowing the balls 122 to leave the groove 150 via the notch 157, the moveable awning window 18 can pivot to a 90 degree angle from the vertical position of the fixed window frame and be removed via the hook-like hinge 110, 112. If more rigid flexible extensions 120a are required to make the entire length of the operator arm 120 firmer, as may be desired to steady larger and wider windows, the inner flange 158 of the lower portion of frame 20 of the moveable awning window 18 may be notched in the central location thereof to compensate for the reduced flexing capability of a stiffer and sturdier flexible extension 120a on the rigid arm 120b.

FIG. 12 is a plan view horizontal cross section of the lower half of the window assembly with the moveable window assembly 18 in the closed position, except that this moveable window 18 is also shown in broken lines in the most extreme open position. This horizontal cross section is shown as two half windows, a wider half on the right and a narrower half on the left. A narrow window must have short flexible extensions 120a on its rigid arms 120b so that they can be stored when the moveable window 18 is closed. A narrow window cannot be opened as far as a wider moveable window 18 which has relatively long flexible extensions 120a on the ends of the rigid arms 120b. Such can readily be seen in FIG. 12.

Figure 14:
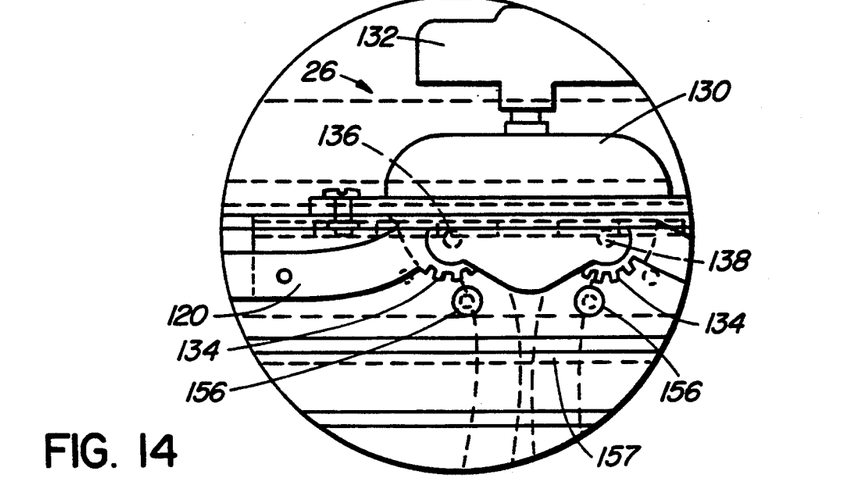
FIG. 14 is an enlarged view of the operator mechanism and arms shown in FIG. 12.

FIG. 14 is a horizontal plan view of the operator 26 and hinge 140 it is mounted on. The operator arms 120 are shown in the closed position as well as in broken lines in the open position. The set screws 156 are located in close proximity to the groove 150 in the track 151 the balls 122 travel in during opening and closing of the moveable awning window 18, and close to where the notch 157 in the lower flange of the track 151 is located.

Preferred embodiments of the invention have been described and illustrated by way of example. Those skilled in the art will realize that various changes and modifications may be made while still remaining within the spirit and scope of the invention. For definitions of the invention, reference is to be had to the appended claims.

What is claimed is:

1. A window operator for a window assembly including a pivotally mounted window having a movable window frame co-operable with a fixed window frame, said window operator including an operating mechanism mounted to said fixed window frame, wherein an elongated guide track extends along a portion of the movable window frame, the operating mechanism including elongated arm means and means for effecting pivotal motion of said arm means relative to the fixed window frame, the arm means having motion transmitting means mounted to distal free end portions of same, said motion transmitting means adapted to move therealong as the arm means are pivoted thereby to pivot the movable window frame between open and closed positions and wherein said motion transmitting means comprises a ball rotatably mounted to the distal end of the arm means, said ball adapted to be received and retained in said guide track and moving both longitudinally of the track and rotating relative to both the track and said arm when in use as the arm means is pivoted by the operating mechanism to move the window frame between the open and closed positions, said arm means including an inner rigid arm portion adjacent the operating mechanism and an outer flexible arm portion attached to and projecting outwardly of a distal end portion of the rigid arm portion, and said ball being rotatably mounted to the distal end of said flexible arm portion, said flexible arm portion comprising a flat strip capable of flexing as the movable window frame opens and closes, and wherein said ball comprises two semi-spherical portions connected by a stem, said strip having an aperture receiving said stem at its distal end and said ball portions being disposed on opposing sides of said strip in slightly spaced relation thereto to ensure free rotation of the ball relative to the strip as the ball is moved by the arm means along the groove of the guide track.

2. The window operator of claim 1 wherein said stem is in a force fit relation within a hole in one of said ball portions, the stem length being greater than the hole depth to provide the clearance necessary to allow free rotation of the ball relative to the flexible strip.

3. The window operator of claim 2 wherein the stem has external grooves extending axially thereof which can deform when the stem is forced into the hole in said one ball portion and/or to allow trapped air to escape from the hole and/or to help compensate for thermal expansion and contraction.

4. The window operator of claim 1 wherein said ball is of a synthetic plastics material and said strip is of a metal having spring-like characteristics.

5. A window assembly, comprising a pivotally mounted window having a movable window frame co-operable with a fixed window frame, a window operator including an operating mechanism mounted to said fixed window frame, an elongated guide track extending along a portion of the movable window frame, the operating mechanism including elongated arm means and means for effecting pivotal motion of said arm means relative to the fixed window frame, the arm means having motion transmitting means mounted to distal free end portions of same, said motion transmitting means being engaged with said elongated guide track and adapted to move therealong as the arm means are pivoted thereby to pivot the movable window frame between open and closed positions and wherein said arm means comprises a pair of free-ended arms adapted to pivot towards and away from one another to pivot the movable window frame between the open and closed positions respectively, said motion transmitting means comprising a pair of balls each being rotatably mounted to the distal end of a respective one of said arms for rotation relative thereto, and said guide track defining a groove shaped to complement the shape and size of the balls and said groove securing the balls directly therein while permitting free movement of the balls therealong; said operating mechanism including hinge means mounting said operating mechanism to the fixed window frame to allow said arms to pivot about an axis defined by said hinge means with said balls on the distal ends of said arms moving both longitudinally of and rotating relative to both said arms and said guide track during movement of the movable window frame between the open and closed positions.

6. The window assembly of claim 5 wherein each of said arms includes an inner rigid arm portion adjacent the operating mechanism and an outer flexible arm portion connected to and projecting outwardly of a distal end portion of the associated rigid arm portion; said balls each being rotatably mounted to a free distal end portion of a respective one of said flexible arm portion.

7. The window assembly of claim 6 wherein each flexible arm portion comprises a flat strip capable of flexing as the movable window frame opens and closes.

8. The window assembly of claim 7 wherein each said ball comprises two semi-spherical portions connected by a stem, said strip having an aperture receiving said stem at its distal end and said ball portions being disposed on opposing sides of said strip in slightly spaced relation thereto to ensure free rotation of the ball relative to the strip as the balls are moved by their respective arms along the groove defined by the guide track in the movable window.

9. The window assembly of claim 8 wherein said stem is in a force fit relation within a hole in one of said ball portions, the stem length being greater than the hole depth to provide the clearance necessary to allow free rotation of the ball relative to the flexible strip.

10. The window assembly of claim 9 wherein the stem has external grooves extending axially thereof which can deform when the stem is forced into the hole in said one ball portion and/or to allow trapped air to escape from the hole and/or to help compensate for thermal expansion and contraction.

11. The window assembly of claim 10 wherein said ball is of a synthetic plastics material and said strip is of a metal having spring-like characteristics.

12. A window assembly according to claim 5 wherein said track is provided with a notch sized to allow said balls to leave said groove, and removable stop means located adjacent said notch to prevent the balls from leaving the groove during normal use.

13. A window assembly according to claim 12 wherein said stop means comprises a pair of screws in flanking relation to said notch.

* * * * *